Patented July 10, 1928.

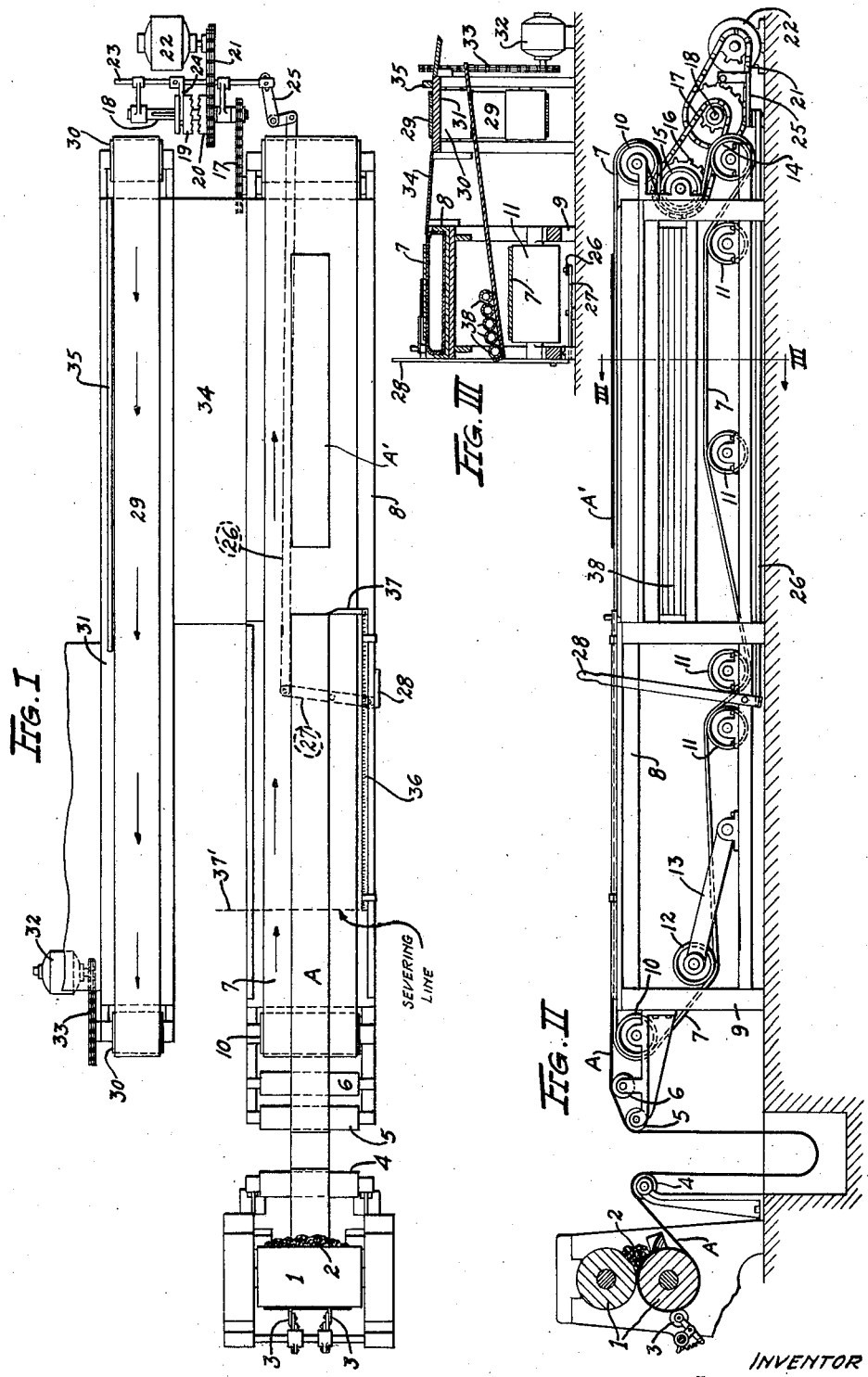

1,676,776

UNITED STATES PATENT OFFICE.

JOHN A. FLEISCHLI, OF CLAYTON, MISSOURI, ASSIGNOR TO CUPPLES COMPANY, MANUFACTURERS, OF ST. LOUIS, MISSOURI, A CORPORATION OF MISSOURI.

METHOD OF AND APPARATUS FOR MAKING RUBBER TUBES.

Application filed July 27, 1925. Serial No. 46,239.

This invention relates to a method of and apparatus for making rubber tubes, the main object being to effect a saving of time and labor in the manufacture of the tubes.

Prior to this invention, rubber tubes have been made by shaping strips of sheet rubber around mandrels, and the preliminary operations have consisted in passing plastic rubber between calender rolls to form a strip of sheet rubber which passes to a winding reel where the strip is wound to form large rolls. In carrying out this old method, a strip of non-adhesive protective material is wound up with the rubber to prevent cohesion that would solidify the mass of plastic rubber. The rolls of sheet rubber are then carried away from the sheet-forming department and placed in storage until required for the manufacture of tubes. Thereafter, the rolls of sheet material are withdrawn from storage and placed upon a stationary table where they are unrolled and cut into sections of the length desired for the tubes.

One of the objects of the present invention is to produce an entirely satisfactory and practicable method wherein the strip of sheet material is cut into sections of the desired length as it passes from the sheet-forming calender rolls, thereby eliminating the numerous intermediate operations heretofore involved in winding, storing and unwinding the sheet material. The use of the non-adhesive protective strip is also dispensed with.

A further object is to minimize the work of handling the rubber strip immediately before the cutting operation and also immediately before the tube-forming operation.

With the foregoing and other objects in view, the invention comprises the novel combination of operations hereinafter more specifically described and illustrated by the accompanying drawing which shows one embodiment of the invention. However, it is to be understood that the invention comprehends changes, variations and modifications within the scope of the claims hereunto appended.

Briefly stated, the method herein set forth comprises the step of passing plastic rubber between rolls to form a strip of sheet rubber, and intermittently severing the strip at a point between its free end and the rolls, so as to provide sections of the length desired for tubes. The strip is constantly fed from the rolls, but an intermittent motion is preferably imparted to the free end of the strip, so the severing operation can be performed while the end to be severed is at rest, and it is desirable to accomplish this without stopping the sheet-forming rolls. If there is a constant delivery from the rolls while an intermittent motion is imparted to the free end of the strip, some precaution must be taken to prevent mutilation or adhesion of the intermediate portions of the strip. For example, the strip passing from the rolls may be dropped into an open space where the intermediate portion of the strip hangs in the form of a loop, and the intermittent motion of the end portion of the strip will merely vary the size of this depending loop.

The rubber strip is thus formed and immediately cut into sections of the length desired, and these sections can be immediately shaped to form the tubes.

Fig. I is a top view of an apparatus adapted for use in carrying out the method.

Fig. II is a side elevation of the apparatus, with the calendar rolls shown in section.

Fig. III is a transverse section taken approximately on the line III—III in Fig. II.

1 designates calender rolls that are rotated constantly by any suitable power mechanism (not shown), and 2 designates a mass of plastic rubber supplied to the rolls to form a strip of sheet rubber A. Cutting wheels 3 cooperate with the lower roll 1 to trim excess material from the side edges of the strip. This strip of sheet rubber passes over a roll 4 where it hangs in the form of a loop extending from the roll 4 to a roll 5 and then passes over a roll 6 to an endless conveyor belt 7.

This endless belt surrounds a table 8 supported by legs 9. The means for guiding and driving the endless belt comprises rolls 10 at opposite ends of table 8, a series of rolls 11 below the table, a belt-tightening roll 12 on an arm 13 below the table, a roll 14 near the right hand end of the table, and a driving roll 15 above the roll 14. A sprocket wheel 16, secured to the shaft of driving roll 15, is driven by a chain 17 passing around a smaller sprocket wheel on a shaft 18. As shown in Fig. I, a clutch member 19 splined to the shaft 18 is adapted to engage a clutch member 20 on the hub of a sprocket wheel driven by a chain 21 extending from a motor 22. When the clutch member 19 occupies the position shown in Fig. I, the clutch member 20 is idly driven without actuating the shaft 18, but when the clutch member 19 is shifted to engage the member 20, the shaft 18 will be rotated to drive the endless conveyor belt 7.

As an illustration of a suitable means for shifting the clutch member 19 to impart an intermittent motion to the conveyor belt, Fig. I shows a slidable rod 23 provided with a shifting arm 24 which extends into a peripheral groove in the clutch member 19. The means for actuating the slidable rod 23 and its arm 24 comprises a bell crank lever 25 at one end of said rod, a connecting bar 26 extending from lever 25 to a lever 27 and an operating lever 28 suitably connected to the lever 27. The motion of the endless conveyor belt 7 is controlled by the lever 28 whereby motion is transmitted to the shiftable clutch member 19. However, it is to be understood that the present invention is not limited to any of these mechanical elements.

Another endless conveyor belt 29 is located adjacent to the belt 7, and these belts move in opposite directions as indicated by arrows in Fig. I. The belt 29 passes around rolls 30 at the ends of a table 31 and it is driven by a motor 32 and sprocket chain 33 associated with one of the rolls 30, as shown at the left of Fig. I.

To provide for the transfer of tubes from belt 7 to belt 29, an inclined sheet 34 (Figs. I and III) extends downwardly from table 8 to table 31, the latter having a stop bar 35 to limit the motion of the tubes.

Any suitable means may be employed to aid in determining the length of the strips to be used in forming the tubes. Fig. I shows a measuring bar 36 movably mounted on the table 8 and having an indicating finger 37 at one end, the severing line being at the other end of the measuring bar. When the conveyor belt 7 is at rest, the measuring bar is adjusted to locate its finger 37 at the end of the rubber strip A, and the strip is then severed at the imaginary dotted line 37' shown in Fig. I.

The operations of forming the strip of sheet rubber and converting it into tubes proceed continuously. The calender rolls 1 are driven constantly but it is convenient to intermittently advance the free end of the rubber strip, so as to provide intervals of rest for the severing and tube-forming operations. For this reason an intermittent motion may, if desired, be imparted to the conveyor belt 7. The operating lever 28 is located at the severing station where it can be readily shifted to stop and start the conveyor belt 7.

When the conveyor belt 7 is at rest, the constantly rotating calender rolls 1 feed the strip of rubber over the roll 4 and into the unobstructed space between the rolls 4 and 5. After each severing operation, the end of the strip A may be lifted and moved backwardly so as to provide a space between the strip and the section severed therefrom. Thereafter, the conveyor belt 7 is driven to advance the severed section ahead of the adjacent end of the strip. In Fig. I the severed section A' is located at the tube-forming station, and this section is separated from the end of the strip A. When the parts are positioned as shown in this view, the conveyor belt is at rest, and while the strip is severed on the line 37 a mandrel is placed on the free strip-section A' to form a tube. In Figs. II and III a supply of tube-forming mandrels is shown at 38. The operator places one of these mandrels on the strip A' and then rolls the mandrel toward the inclined surface at 34, so as to form the tube around the mandrel. The tube and mandrel are then rolled across the surface 34 to the conveyor belt 29 which carries them to another operator.

Successive portions of the continuous strip are thus shaped into the form of tubes while the strip is passing from the calender, and when the operation is carried out as herein described, both ends of the tube are formed at the same time, for the mandrel does not move longitudinally during the tube winding operation. Each end edge of the tube is in volute form near an end of the mandrel, and by simultaneously forming both ends in this manner, the final part of the winding operation is performed by acting upon a terminal marginal portion of the strip coextensive with the length of the tube. Owing to the adhesive condition of rubber stock issuing from a calender as herein described, the long terminal margin just referred to is securely held by adhesion in a line extending from end to end of the tube.

If the calender rolls 1 are driven constantly while the conveyor belt 7 is driven intermittently to provide intervals of rest for the severing and tube-forming operations, it is to be understood that the conveyor belt is driven at a relatively high speed so as to quickly advance the portions of the strip A which accumulate in the space between rolls 4 and 5 while the conveyor is at rest.

To set forth one form of the invention, I have referred to a tube-forming station at A', but it is to be understood that the tubes may be formed at any convenient point. In the apparatus shown by the drawing, the table or support 8 lies under the portion of the conveyor belt at the severing station, and it is obvious that the tubes could be formed at this station.

The rubber tubes formed by this method can be given any desired subsequent operations not herein pointed out, and actual experience has shown that the method herein disclosed can be used most advantageously in the manufacture of inner tubes for automobile tires. The advantage lies in the preliminary operations whereby the strip of rubber passing from the calender rolls is immediately severed into short sections which are promptly shaped to the form of tubes. Since the subsequent operations may be carried out in any suitable manner I do not deem it necessary to describe them.

I claim:

1. In the art of making rubber tubes, the method which comprises constantly passing plastic rubber between constantly rotating rolls to form a strip of sheet rubber, intermittently advancing the free end portion of said strip, cutting said strip into sections of the length desired for the tubes, and then forming the tubes by rolling the sections around mandrels transversely of the direction in which the strip is fed.

2. In the art of making rubber tubes, the method which comprises constantly feeding a strip of sheet rubber into an open space, intermittently advancing the free end portion of said strip with intervals of rest and without stopping the delivery to said space, and severing the end portions of the strip during said intervals of rest, so as to provide sections of the length desired for tubes, and shaping said sections into the form of tubes while the strip is passing into said open space.

3. In the art of making rubber tubes, the method which comprises constantly passing plastic rubber between constantly rotating rolls to form a strip of sheet rubber, intermittently advancing the free end of said strip with intervals of rest and without stopping the delivery from said rolls, severing the end portions of said strip during the intervals of rest, so as to provide sections of the length desired for tubes, and shaping said sections into the form of tubes while said strip is passing from the rolls.

4. In the art of making rubber tubes, the method which comprises passing plastic rubber between constantly rotating rolls to form a strip of sheet rubber, leading said strip from said rolls through an open space to a severing station, intermittently advancing the free end of said strip with intervals of rest whereby an intermediate portion of the strip is dropped in said open space, severing the free end portions of said strip during said intervals of rest, so as to provide sections of the length desired for tubes, and shaping said sections during the intervals of rest into the form of tubes.

5. In the art of making rubber tubes, the method which comprises constantly passing plastic rubber between constantly rotating calender rolls to form a strip of sheet rubber, dropping intermediate portions of the strip into an unobstructed space, leading the free end of said strip to a conveyor, imparting an intermittent motion to said conveyor so as to intermittently withdraw portions of the strip from said space, severing the free end portions of the strip while they are at rest, so as to provide sections of the length desired for tubes, and shaping said sections during the intervals of rest into the form of tubes.

6. In the art of making rubber tubes, the method which comprises passing plastic rubber between constantly rotating rolls to form a strip of sheet rubber, intermittently severing said strip at a point between its free end and said rolls so as to provide sections of the length desired for tubes, advancing each of said sections ahead of the remaining end of the strip to a tube-forming station, and shaping said sections into the form of tubes at said station.

7. In the art of making rubber tubes, the method which comprises passing plastic rubber between constantly rotating calender rolls to form a strip of sheet rubber, intermittently severing said strip at a point between its free end and the rotating rolls so as to provide sections of the length desired for tubes, intermittently advancing the free end of said strip with intervals of rest for the severing operations, advancing each of said sections ahead of the end from which it is severed, and shaping said sections into the form of tubes during said intervals of rest.

8. In the art of making rubber tubes, the method which comprises passing plastic rubber between constantly rotating calender rolls to form a strip of sheet rubber, intermittently severing said strip at a point between its free end and the rotating rolls so as to provide sections of the length desired for tubes, intermittently advancing the free end of said strip with intervals of rest for the severing operations, imparting backward motion to the free end of the strip after each severing operation so as to provide a space between the strip and the section severed therefrom, simultaneously advancing the free end of the strip and the severed section spaced therefrom, and rolling the severed sections around tube-forming mandrels during said intervals of rest.

9. The method of making rubber tubes which comprises continuously forming a strip of sheeted rubber stock, feeding it from forming position to a tube-rolling position, dividing said strip into blanks, separating the blanks and strip from each other, so that each blank arrives at the tube-rolling position in spaced apart relation to the next, and there rolling the successive blanks upon mandrels in the form of tubes thereon.

10. The method of making rubber tubes which comprises continuously forming a sheet of rubber stock in continuous strip form, feeding it longitudinally from the forming position into a reserve loop, intermittently withdrawing the strip from the reserve loop in continuous form, severing the strip transversely into successive blanks between the intermittent feeding movements, and forming each blank into a tube by shaping the blank after its severance from the continuous strip.

11. The method of making rubber tubes which comprises continuously forming a sheet of rubber stock, feeding it from forming position, severing blanks therefrom as it passes from said position, feeding said blanks to a rolling position, and there supporting each blank in spaced apart relation to the following blank while mounting it upon a mandrel by rolling the mandrel transversely upon the blank.

12. Tube-making apparatus comprising means for continuously forming a sheet of rubber stock, an endless-belt conveyor adapted to receive and convey the sheeted stock, means for intermittently driving the said conveyor, means for supporting a variable quantity of the stock in continuous-strip form between the forming means and the said conveyor, and a plane-faced support underlying and supporting in longitudinally flat condition a sufficiently extensive portion of the upper reach of the conveyor belt to provide a rolling table for a tube mandrel rolled transversely of the conveyor to pick up the stock as a tube thereon.

13. In a tube-forming apparatus, a support, and means whereby a continuous strip of plastic, adhesive rubber stock is formed and continuously fed toward said support, said support being adapted to permit rolling of a section of said strip on a mandrel, and there being provided intermittently driven means whereby portions of said strip are moved at a greater speed than the feeding speed of the first mentioned means.

14. In a tube-forming apparatus, means whereby a continuous strip of plastic, adhesive rubber stock is formed and continuously fed into a reserve loop, and a support adapted to permit rolling of a portion of said strip on a mandrel, there being provided intermittently driven means whereby portions of said strip are intermittently withdrawn from said loop.

15. In a tube-making apparatus, means for continuously forming a strip of plastic, adhesive sheet rubber stock, a conveyor to receive said strip, and a support for the conveyor and strip, said support being adapted to permit rolling of a severed section of the strip onto a mandrel.

16. In a tube-making apparatus, means for continuously forming a strip of plastic, adhesive sheet rubber stock, a conveyor to receive said strip, said conveyor intermittently traveling at a greater speed than the feeding speed of said means, and a support for the conveyor and strip, said support being adapted to permit rolling of a severed section of the strip onto a mandrel.

17. In a tube-making apparatus, a strip-forming means continuously feeding a strip of plastic, adhesive sheet rubber stock into a reserve loop, a conveyor receiving the strip from said loop, and a support for said conveyor and strip, said support being adapted to permit rolling of a severed section of the strip onto a mandrel.

18. In a tube-making apparatus, strip-forming means continuously feeding a strip of plastic, adhesive sheet rubber stock into a reserve loop, a conveyor receiving the strip from said loop, and a support for said conveyor and strip, said support being adapted to permit rolling of a severed section of the strip onto a mandrel, said conveyor being intermittently driven at a greater speed than the rate of feed to said loop.

In testimony that I claim the foregoing I hereunto affix my signature.

JOHN A. FLEISCHLI.